United States Patent [19]

Winn et al.

[11] Patent Number: 4,970,655

[45] Date of Patent: Nov. 13, 1990

[54] AUTOMATIC FEE COLLECTING AND RECEIPT DISPENSING SYSTEM

[75] Inventors: R. Keith Winn, Encinitas; Christ M. Rousseff, Rancho Santa Fe, both of Calif.

[73] Assignee: American Registration Systems, Inc., Encinitas, Calif.

[21] Appl. No.: 265,762

[22] Filed: Nov. 1, 1988

[51] Int. Cl.[5] .......... G06F 15/00

[52] U.S. Cl. .......... 364/479; 235/381; 902/18; 902/21

[58] Field of Search .......... 364/479, 468; 235/379, 235/380, 381; 902/4, 5, 21, 20, 40, 18

[56] References Cited

U.S. PATENT DOCUMENTS

| | | | |
|---|---|---|---|
| Re. 32,115 | 4/1986 | Lockwood et al. | 235/381 |
| 3,943,335 | 3/1976 | Kinker et al. | 902/21 |
| 4,023,013 | 5/1977 | Kinker | 902/5 |
| 4,319,336 | 3/1982 | Anderson et al. | 902/20 |
| 4,414,467 | 11/1983 | Gould et al. | 235/381 |
| 4,458,802 | 7/1984 | Maciver et al. | 194/4 R |
| 4,484,304 | 11/1984 | Anderson et al. | 902/40 |
| 4,567,359 | 1/1986 | Lockwood | 235/381 |
| 4,596,924 | 6/1986 | Watanabe | 235/379 |
| 4,650,977 | 3/1987 | Couch | 235/379 |

*Primary Examiner*—Allen MacDonald
*Attorney, Agent, or Firm*—Brown, Martin, Haller & McClain

[57] ABSTRACT

An automatic fee receiving and receipt dispensing system, particularly designed for vehicle registration transactions and the like, comprises an outer housing with a customer interface for displaying information to a customer and receiving customer input and fee payment, and a dispenser assembly in the housing for storing forms specific to the transaction having pre-printed areas and blank areas for receiving information specific to a transaction, a printer for printing information in the blank areas of the forms, and a dispensing device for dispensing printed forms to customers. A control unit in the housing controls operation of the customer interface and dispenser assembly, and is linked via an interface to a remote database containing transaction and fee information, for example vehicle registration records. The control unit communicates with the database to obtain transaction information from the database and to compare the information obtained with that entered by the customer, approving the transaction if the information matches, displays fee information on verification, and dispenses the appropriate receipt form on detection of fee payment or authorization.

19 Claims, 5 Drawing Sheets

AUTOMATIC FEE COLLECTING AND RECEIPT DISPENSING SYSTEM

BACKGROUND OF THE INVENTION

The present invention relates generally to a system for automatically collecting fees and dispensing receipts, and is particularly directed to a system for collecting fees due at regular time intervals, such as Government fees for automobile registration, driver's license extensions, taxes, hunting licenses, and so on.

Currently, Government fee collections are limited to labor intensive offices having limited opening hours and working days. This generally involves the customer in a lengthy wait at times which may be inconvenient. Also, the offices are of a limited number, and centrally located in areas which may be inconveniently situated for many customers. Various mail-in services are available, but require reliance on the mail, planning and early payment of fees. For a variety of reasons, a significant percentage of the public does not utilize mail based registration, license or fee payment systems.

Various automatic, unattended vending machines have been proposed in the past in some fields, particularly banking, postage stamp vending, videotape vending, and airline ticket vending. These generally involve one-off sales of articles or money dispensing. Such systems are generally of limited capacity.

One system for unattended automobile registration has been proposed in the past by Diebold Co. This involves the mailing to each customer of a so-called "Smart Card" containing the particular vehicle registration information, which the customer then uses at the machine to allow dispensing of the appropriate printed receipt or registration form and one or more separate stickers with the registration year and month for applying to the vehicle license plate in the standard fashion. This system is therefore off-line during normal operation, and considerable expense would be involved in producing and mailing the required smart cards. Also, customers may lose the card, or the relatively small sticker which is dispensed separately from the registration form. This system also requires a separate, off-site mainframe computer to control the network of customer machine sites. The off-site mainframe has to maintain a data base containing information on all vehicle files currently in the state computer, which must be continuously updated. This gives rise to various security and logistical problems, which would be a considerable drawback in many cases, and may not be permitted by some authorities.

SUMMARY OF THE INVENTION

It is an object of the invention to provide an improved unattended machine or system capable of collecting fees and dispensing appropriate receipts.

According to the present invention, an automatic fee collecting and receipt dispensing system is provided, comprising an outer housing, a customer interface assembly on the outside of the housing including a display unit for displaying information and instructions to a customer, a control device for allowing a customer to enter commands and information, and a fee collection device. A dispenser assembly in the housing includes one or more containers containing standard pre-printed receipt forms for at least one fee-associated service, the forms having blank areas for receiving information specific to a particular transaction, a printer for printing information in the blank areas, a transport mechanism for transporting forms from the containers to the printer, and a dispensing unit for dispensing printed forms to a customer. A control unit in the housing controls operation of the dispenser assembly and display unit, and is linked to the customer control device and fee collection device to receive information and commands entered by a customer and to detect fee payment. The control unit is also connected to an interface unit for linking the control system to a remote computer containing stored information on customer transactions and fees, the interface unit allowing communication back and forth between the local control unit and remote host computer. The local control unit contains stored program instructions for controlling the dispenser assembly to dispense the appropriate form in response to information and fee payment received from a customer, and information received from the remote computer, which it verifies with the information received from the customer before approving the transaction, and to control the printer to print the appropriate transaction information in the blank areas of the form prior to dispensal. The control unit also communicates information on each completed transaction to the remote computer for up-dating the stored information.

In the preferred embodiment of the invention, the system is designed for payment of fees due at regular time intervals, such as Government fees for automobile registration, driver's license extensions, taxes, hunting licenses and so on. It may also be used for such one-off payments as payment of parking tickets or other fines, user fees for public areas such as campgrounds, and so on. With minimal modifications, the system may be arranged to dispense other types of certificates or goods, such as welfare checks or food stamps, for example. The system in the preferred embodiment requires minimal programming of the remote computer, but instead is configured to perform all the necessary transaction verification steps from information received from the remote database and/or information entered by the customer.

In one preferred embodiment of the invention, an automatic system for automobile registration or like services is provided, in which the dispenser assembly contains multi-part forms including a first layer of paper, card or the like having a first part containing preprinted information according to the particular service being provided, and blank areas for receiving information specific to a particular transaction, and at least one second part which is preferably detachable from the first part. A third part of the form comprises a sticker or tab adhesively secured to the detachable part of the form and having an information bearing area for containing information specific to a particular transaction.

In the case of automobile registration, for example, the removable sticker will be designed for affixation to a vehicle license plate and will be printed with at least the renewal year. The renewal month may be preprinted on the same sticker or on a separate sticker adhesively secured to the detachable part of the form, or to a further detachable part of the form. An identification number for security purposes will also be provided on both the sticker and the registration form. The renewal month and identification number may be preprinted on the sticker or stickers, or may be printed in blank areas provided on the or each sticker by the printer for each transaction. Preferably, the forms have a detachable area carrying a sticker at each end, so that they can be stacked level in the container prior to dispensing. Where two separate stickers are not needed for the particular transaction involved, the second sticker may be blank. Alternatively, forms carrying a single sticker may be stored by placing stickers alternatively on the left and right side of the forms to create a balanced, level stack.

Where the stickers are pre-printed with a renewal date or month, a series of different forms will be provided in separate containers in the dispenser assembly, and the assembly will include a picker mechanism controlled by the control unit to select the appropriately dated form according to the information received from the customer and from the remote host. A single machine may be arranged in this way to perform a variety of different transactions, with standard size forms appropriate to each transaction stored in separate cartridges or containers which can be accessed by the picker mechanism under the control of the control unit. Thus, a single machine can be arranged to perform various transactions involved with motor vehicles, such as registrations, license extensions and the like. Such machines can be provided at numerous locations for customer convenience, avoiding lengthy lines and travelling to remote government offices, and can provide immediate customer access to government services 24 hours a day, 7 days a week.

In the preferred embodiment of the invention, the dispensed form will also have a magnetic stripe of the type provided on credit cards, for example, which carries information on the transaction and can be used by the customer for subsequent renewals. Information is encoded on the card during the printing stage. In this case, the system is arranged to receive forms returned by customers and to read the information on the card to allow dispensing of a renewal based on the encoded information. This saves time since the customer does not have to enter any information at the terminal. Bar codes and optical character recognition (OCR) may be used in conjunction with or in place of the magnetic stripe if desired.

This system can easily be arranged to receive various Government or other fees and to dispense the appropriate receipt forms or certificates, such as driver's licenses, fishing or hunting licenses and the like. The system is unattended, convenient and easily accessible at all times, eliminating lengthy waits in manned offices, and the shortcomings of mail-in services where available.

BRIEF DESCRIPTION OF THE DRAWINGS

The present invention will be better understood from the following detailed description of a preferred embodiment, taken in conjunction with the accompanying drawings, in which like reference numerals refer to like parts, and in which.

DESCRIPTION OF THE PREFERRED EMBODIMENT

Figure 3:
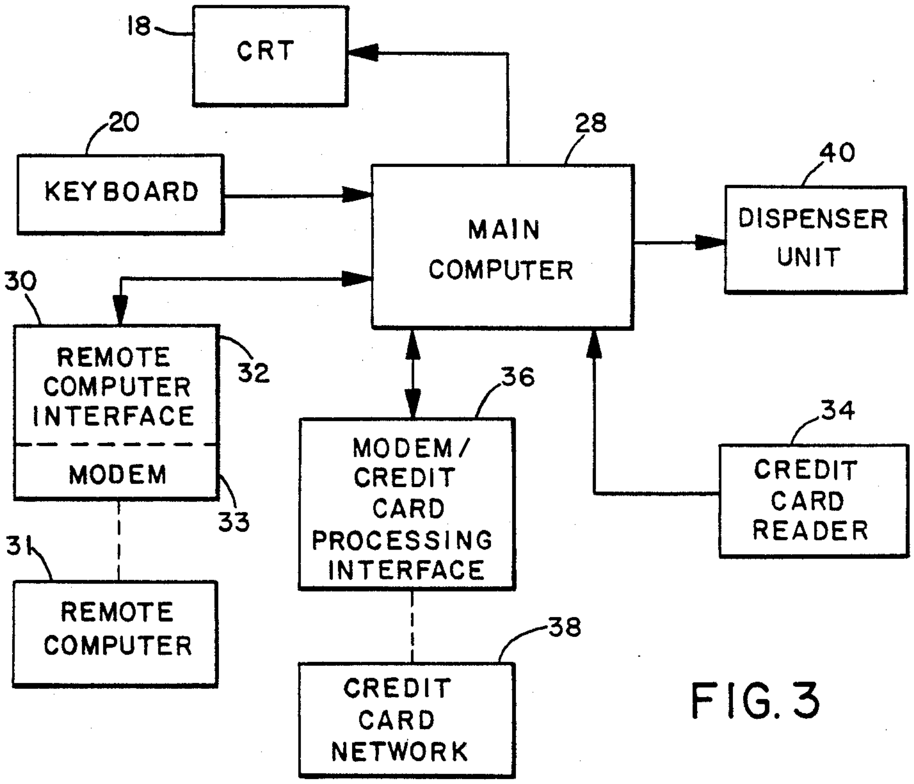
FIG. 3 is a block diagram of the system for operating the machine to receive fees and dispense the appropriate receipt.
Figure 6:
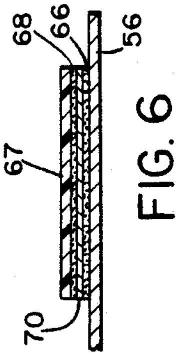
FIG. 6 is a section on the lines 6—6 of FIG. 5.
Figure 4:
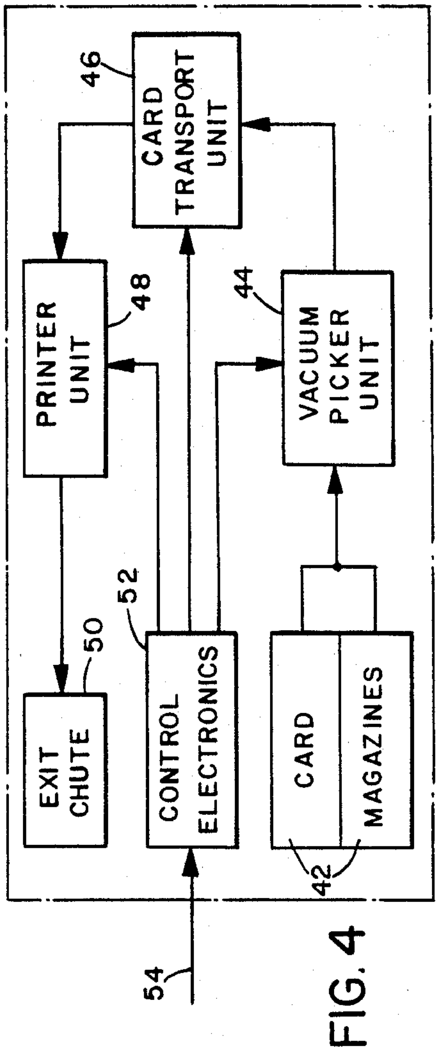
FIG. 4 is a block diagram showing the parts of the dispenser unit in more detail.
Figure 5:
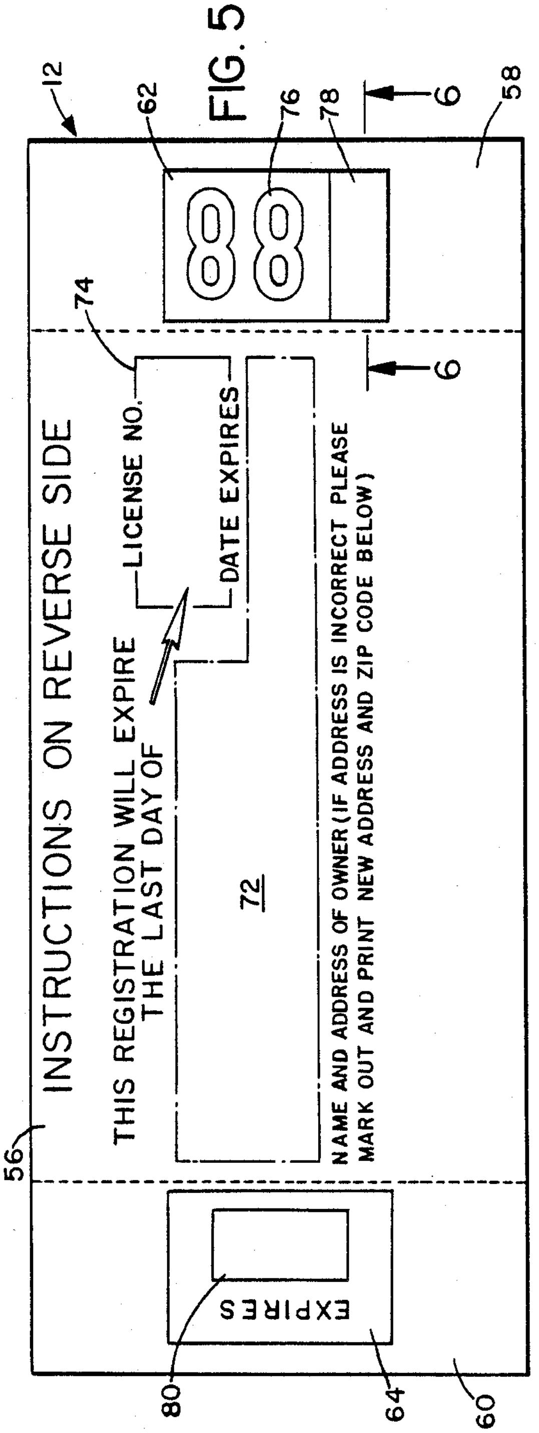
FIG. 5 is a top plan view of a receipt form of the type dispensed by the machine of FIG. 1.

FIGS. 1 to 4 illustrate a machine 10 for automatically receiving fee payments and dispensing forms 12 as illustrated in FIGS. 5 and 6 according to programmed steps as illustrated in FIG. 7. The machine and system illustrated in the drawings is particularly intended for use in renewing automobile registrations, but it will be understood that it may be modified for dispensing other documents in return for appropriate fee payment, either in addition to or instead of automobile registrations, in a similar manner, such as driver's license extensions, hunting or fishing licenses, parking ticket payment receipts, tax receipts, and so on.

The machine basically comprises an outer housing or customer terminal 14 having a customer interface area on its front panel 16. The customer interface area consists of a video display unit or CRT 18, a keyboard 20 below the screen, a credit card slot 22 and a receipt form dispensing slot 24. Preferably, a horizontal shelf 26 is provided beneath the interface area to provide a convenient place for positioning purses, parcels, or papers while using the machine.

Figure 1:
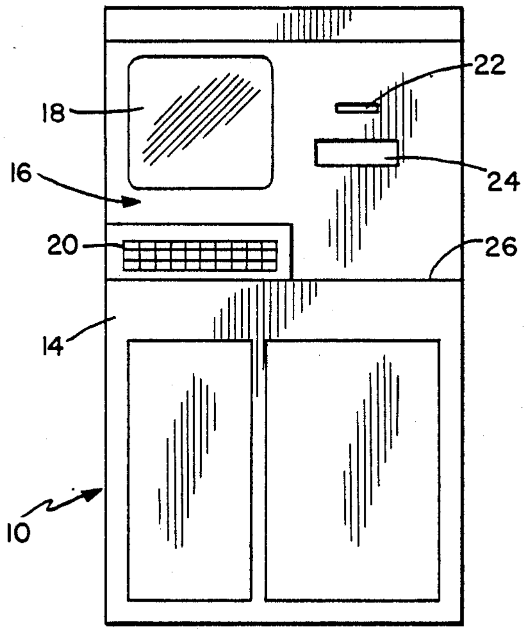
FIG. 1 is a front elevation view of an automatic fee receiving and receipt dispensing machine according to a preferred embodiment of the present invention.
Figure 2:
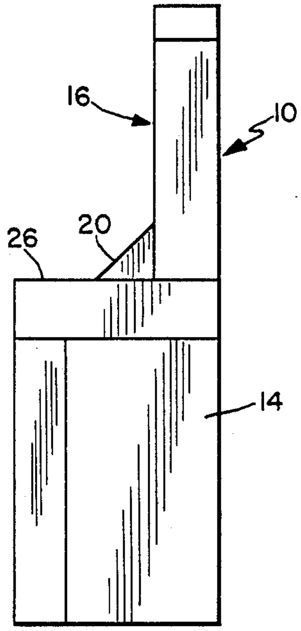
FIG. 2 is a side elevation view of the machine.

The system is controlled by a main computer or control unit 28 within housing 14 which is linked to various peripheral devices as generally illustrated in FIG. 2. Computer 28 is linked via interface unit 30 to one or more remote computers 32 which have a database containing stored records in the particular transaction area covered by the system. If the system is arranged to perform Government or other central authority transactions, it will be linked with the mainframe computer currently used by the Government or other authority to store and process transactions. Thus, in the case of automobile registration, the local computer 28 will be linked to a government database such as a DMV (Department of Motor Vehicles) computer containing stored information on all vehicles registered, including ownership information.

The computer 28 is also linked to the various customer interface devices, including video display unit 16 and keyboard 20. A credit card reader 34 of a standard type is connected to the computer 28 and communicates with slot 22 for receiving cards from a customer and returning them once the card information has been read and verified. The computer communicates via credit card processing interface 36 which provides dial-up point of sale (POS) terminal emulation to access a standard credit authorization/billing network 38 in a known manner, as will be explained in more detail below. A dispenser unit 40 mounted in housing 14 is also connected to the computer 28 as illustrated, and communicates with slot 24 for dispensing appropriate receipt forms to a customer, as explained below.

The dispenser unit 40 is illustrated in more detail in FIG. 4. In the preferred embodiment of the invention, unit 40 comprises a Magtek EP 500 Form Dispenser, available from Magtek, Inc. of Carson City Calif., which is of the type used in the airline industry for dispensing airline tickets. However, in alternative embodiments, other types of form dispensing arrangements may be used, such as a roll stock feeder, printing and dispensing apparatus.

The unit in the preferred embodiment shown consists of at least two magazines or containers 42 in which forms or cards are stacked, a picker unit 44 for removing forms from the magazines, a transport mechanism 46 for transporting forms from the picker unit to a printer unit 48, which prints information on the forms, and an exit or dispensing chute assembly 50 which communicates with slot 24. An electronics control unit 52 controls operation of the picker unit, transport mechanism and printer unit in response to control signals received from the main computer via line 54. The dispenser is connected to the computer via a standard interface device, which in the preferred embodiment of the invention comprises an RS232 card inserted in an expansion slot of the computer. The stored program instructions in the computer memory will include format instructions for controlling the printer unit to print information in the appropriate areas of the form 14.

FIGS. 5 and 6 illustrate a preferred example of the form 14 for use in the unit 40 of FIG. 4 in an automatic vehicle registration system. Vehicle registrations typically include a registration certificate to be maintained in the vehicle, along with a sticker bearing the registration expiry which is applied to the vehicle license plate, indicating to the relevant authorities that the registration requirements have been met. The precise form of the certificate, including the information printed on it, will vary from state to state. The sticker will typically include the year of expiry of the registration and a control or identification code matching the code on the registration certificate, to reduce the risk of fraud. For a new vehicle registration, an additional sticker bearing the vehicle registration renewal month is provided, which is also applied to the vehicle license plate. In subsequent years, only the year of expiry sticker will need to be replaced.

The form illustrated in FIGS. 5 and 6 is designed to be easily adapted to various state requirements, and to provide a uniform format for automobile registration renewal. The form consists of a first part or layer 56 of card, paper or the like having detachable portions or strips 58, 60 at its opposite ends. Detachable stickers 62,64 are attached by adhesive areas 66 to the detachable portions 58,60, respectively. Each sticker is of the type normally applied to vehicle license plates to indicate payment of registration fees, and typically includes a top, information carrying layer 67 of plastic or other weather resistant material, and an adhesive backing layer 68 covered by a detachable paper backing layer 70. A transparent coating of protective material (not shown) normally covers the information carrying top layer 67 to protect against abrasion and various weather conditions including wet weather and hot and cold temperature extremes.

The dimensions of form 14 are designed so that it fits the standard cartridge of the Magtek dispenser described above, while stickers 62 and 64 are dimensioned to fit the appropriate areas on automobile number or license plates. The Magtek cartridges can be modified to support a variety of form sizes. The first part of the form is pre-printed with appropriate information generic to each transaction on one or both faces of the form, with blank areas for printing of information specific to the particular transaction during dispensing. For example in the case of automobile registration, the area 72 outlined in FIG. 5 will contain pre-printed list of generic titles of information to be collected concerning automobile registration, such as year and make of the vehicle, vehicle identification number, registration fee, and so on, with a blank area adjacent each title for entry of that information for the specific transaction. The information may be varied according to the requirements of the particular authority dispensing the registration. Area 74 is for entry of the vehicle license number and the date of expiry of the registration.

The sticker 62 is pre-printed with the year 76 of the registration, and includes area 78 which may be blank but in the preferred embodiment of the invention is pre-printed with the transaction identification or control number, which is also either pre-printed in an appropriate area of the first part of the form or printed onto the first part during dispensing. Sticker 64 has an area 80 for entry of the month of expiry of the registration, as needed for registration of new vehicles. The month may be pre-printed or printed during dispensing. Where the month is pre-printed, forms carrying stickers for the current month and one or more successive months will be stored in separate cartridges in the dispenser unit, with the picker mechanism, which is a vacuum device in the Magtek dispenser described above, will travel to the appropriate cartridge for the renewal month of the particular transaction in progress, to remove the top form from the stack in that cartridge. Where a sticker bearing the month is not needed, sticker area 80 may be blank.

Printer unit of the Magtek dispenser also has the capability of utilizing a magnetic strip on form 14, and, in required applications, includes a magnetic encoder/decoder device for encoding information on the strip and decoding information previously encoded. In the preferred embodiment of the invention, a magnetic strip will be provided on all the stored forms. During the dispense cycle, the strip will be encoded with all the information required for a particular transaction, such as a vehicle registration transaction. This will allow the customer to utilize the form or card in a subsequent renewal transaction to avoid entry of lengthy information on the keyboard. In this case, the dispensing slot may also comprise a receiving slot for such information bearing cards to be entered by customers, and the printer can be modified to read information from the card and convey it to the computer. Standard bar code or optical character recognition (OCR) capabilities may be used in addition to or in place of the magnetic stripe. The printer has the capability of encoding bar code and OCR via the available font set and graphic capabilities.

The computer or central control unit of the system is preferably an IBM-PC or equivalent, which is suitably programmed to control all peripheral devices, provide customer instructions, and communicate with remote systems via standard interface modules. The computer has a memory for storing transaction information and program instructions, suitably in the form of a standard hard disc as well as floppy disks. The system is linked to the video display unit and keyboard in the standard manner via CGA and XT cards, respectively. In alternative embodiments, customer input may be provided via a so-called "Touch Screen" rather than via a separate keyboard, particularly if alphanumeric entry keys are not a primary requirement.

In the preferred embodiment of the invention illustrated, payment of a fee is made via a credit card or debit card. The system may also be arranged to accept cash payments and/or check payments, for example by incorporating coin and bill receiving and verifying modules in the housing, or a check accepting module of the type currently used by some banks and stores, which has an optical scanner for reading check account number information from the check, which information can subsequently be verified. One, two or all of these alternative payment techniques may be provided in the same terminal.

The credit card slot communicates with a motorized credit card reader of a known type, and information read from the card is communicated to the computer via the standard RS232 interface referred to above, in a manner known in the field. The machine may accommodate any of various types of card reader, including motorized and non-motorized versions.

The computer is also connected to a remote credit authorization/billing network for verifying and authorization of the credit card, and for billing of fees applied to the card to the particular credit card company. This connection is made via the RS232 interface which is connected via a credit network point of sale (POS) interface module and modem utilizing the telephone line on a dial-up basis to access the selected credit authorization network, such as FDR (First Data Resources) or Citicorp, through a standard protocol (VISANET). This allows use of all leading credit and debit cards. The POS interface device is programmed to provide the capability of handling all security, authorization and billing protocols required by the credit network provider. It will be understood that this device need not be a separately distinguishable piece of hardware, and in an alternative arrangement its functions may be provided in the software, utilizing a standard modem for telephone access.

The system is linked to one or more remote computers or databases which contain stored information on the particular transaction involved, as explained above. A suitable computer interface links the local computer to the remote computer, which may be a locally situated mainframe computer where the terminal is located in a DMV office, for example, or may be a remotely sited mainframe which is accessed over the phone line. The remote computer interface consists of an interface personality module which handles all protocol conversion routines. This module is an add-on, off-the-shelf card located in an expansion slot of the computer. The type of interface used will depend on the characteristics of the particular mainframe to be accessed, i.e. its hardware and software/architecture. However, in one example of the invention the interface used was an IRMA board produced by DCA, which provides a 3270/3274 interface for communication with IBM compatible mainframes. This interface allows the system to emulate a standard data enquiry/entry station identical to those currently supported by the remote computer, so that the remote computer itself requires only minimal specialized support software. Software encryption protocol can be provided to conform to the state requirements. In the case of a remotely sited mainframe, the remote computer interface includes a modem for access between the local computer and remote computer over a phone communication line, which may be a standard telephone line or a dedicated leased line. The modem handles all telephone line interface and control considerations, and may be continuous in the case of a leased line, or on a dial-up basis for each transaction. Alternative communications linkage capabilities may be provided in some applications, such as microwave or satellite communication capabilities.

The credit card authorization/billing link may be provided separately from the remote mainframe communication link, as illustrated in FIG. 3, or alternatively the remote computer interface may be utilized to transfer credit information to the mainframe, with the mainframe itself providing access to the credit authorization and billing network.

Figure 7A:
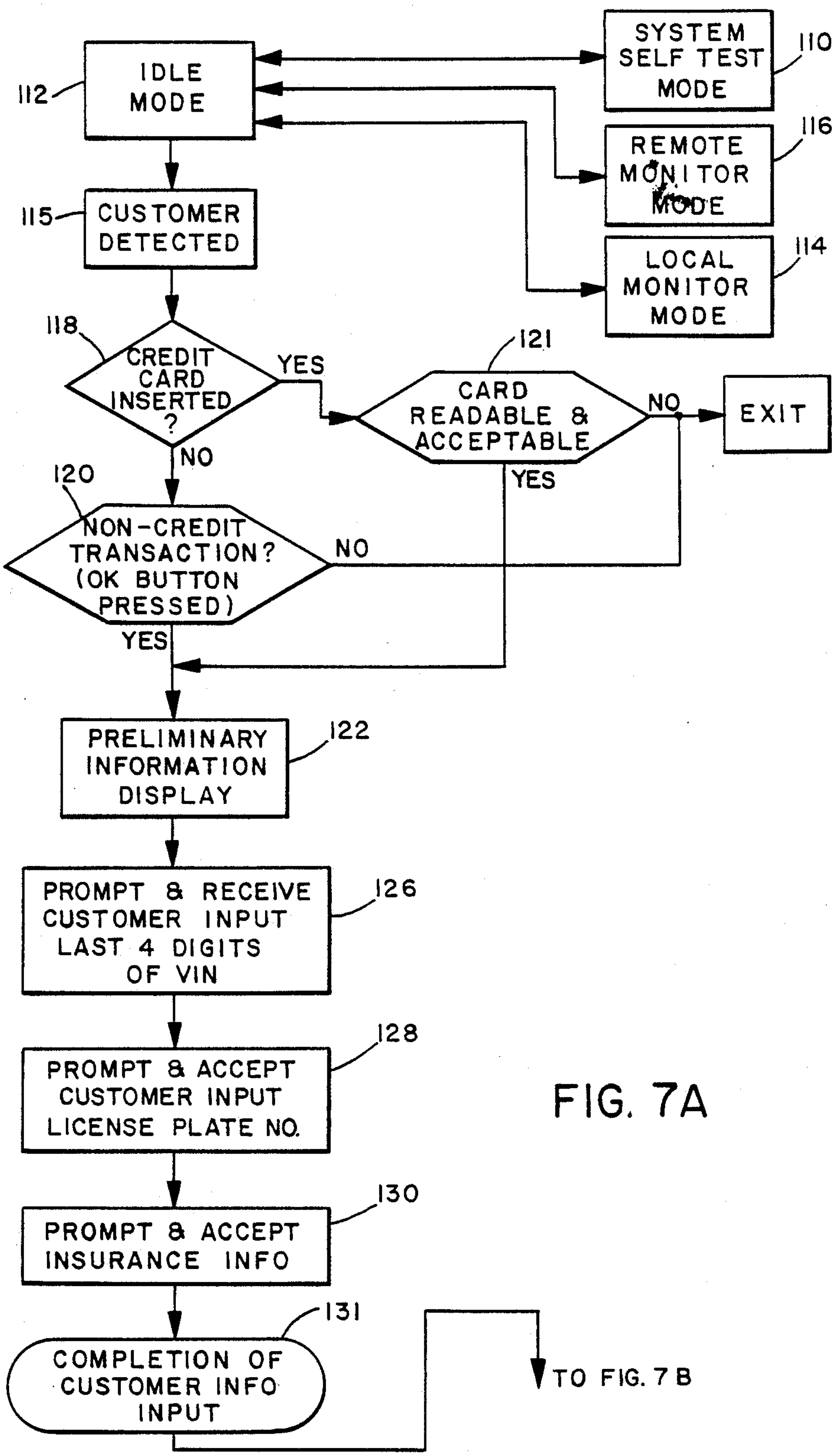
FIG. 7A-7C are a flow diagram showing the steps carried out by a program controlling the system of FIG. 3.
Figure 7B:
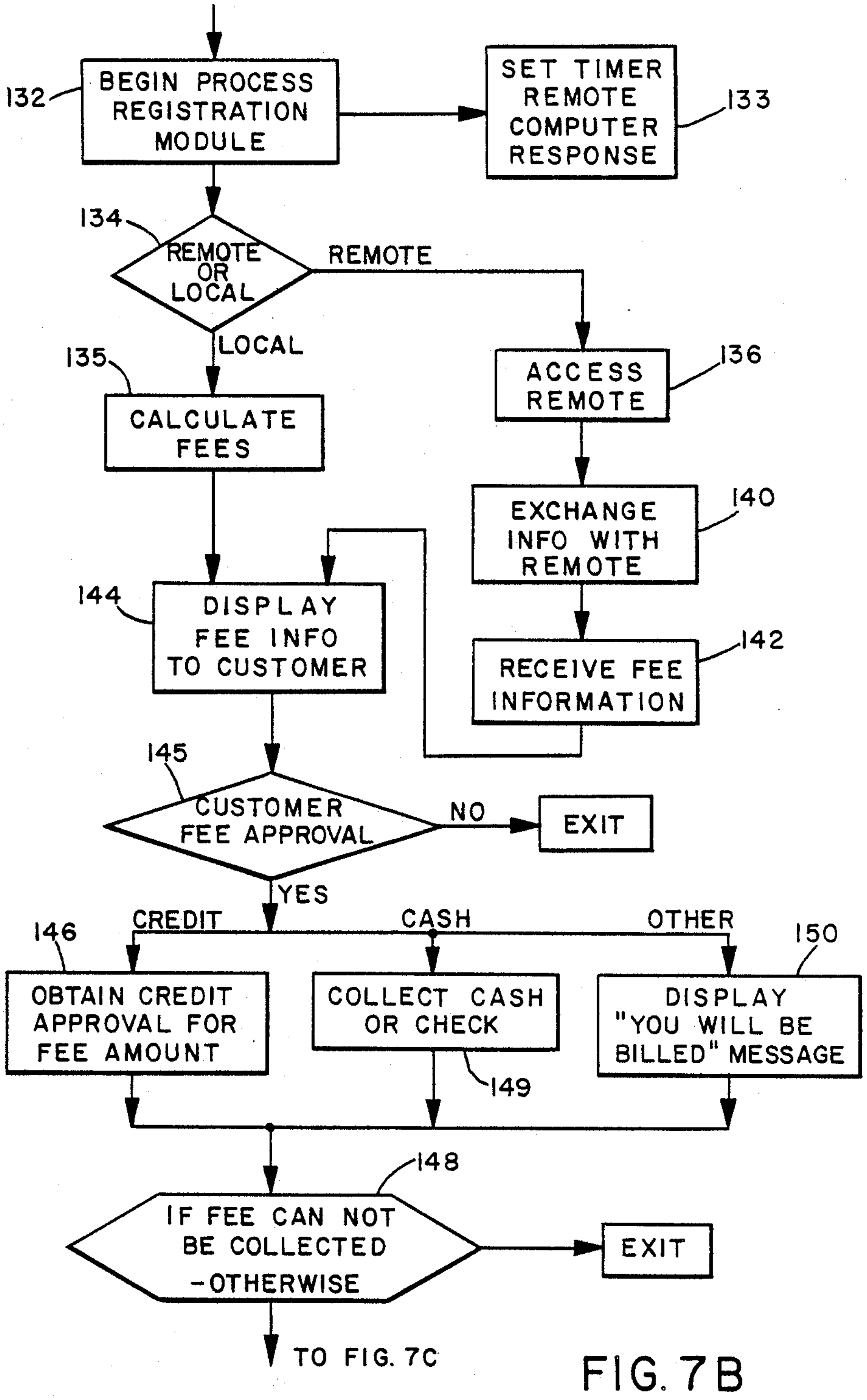
Figure 7C:
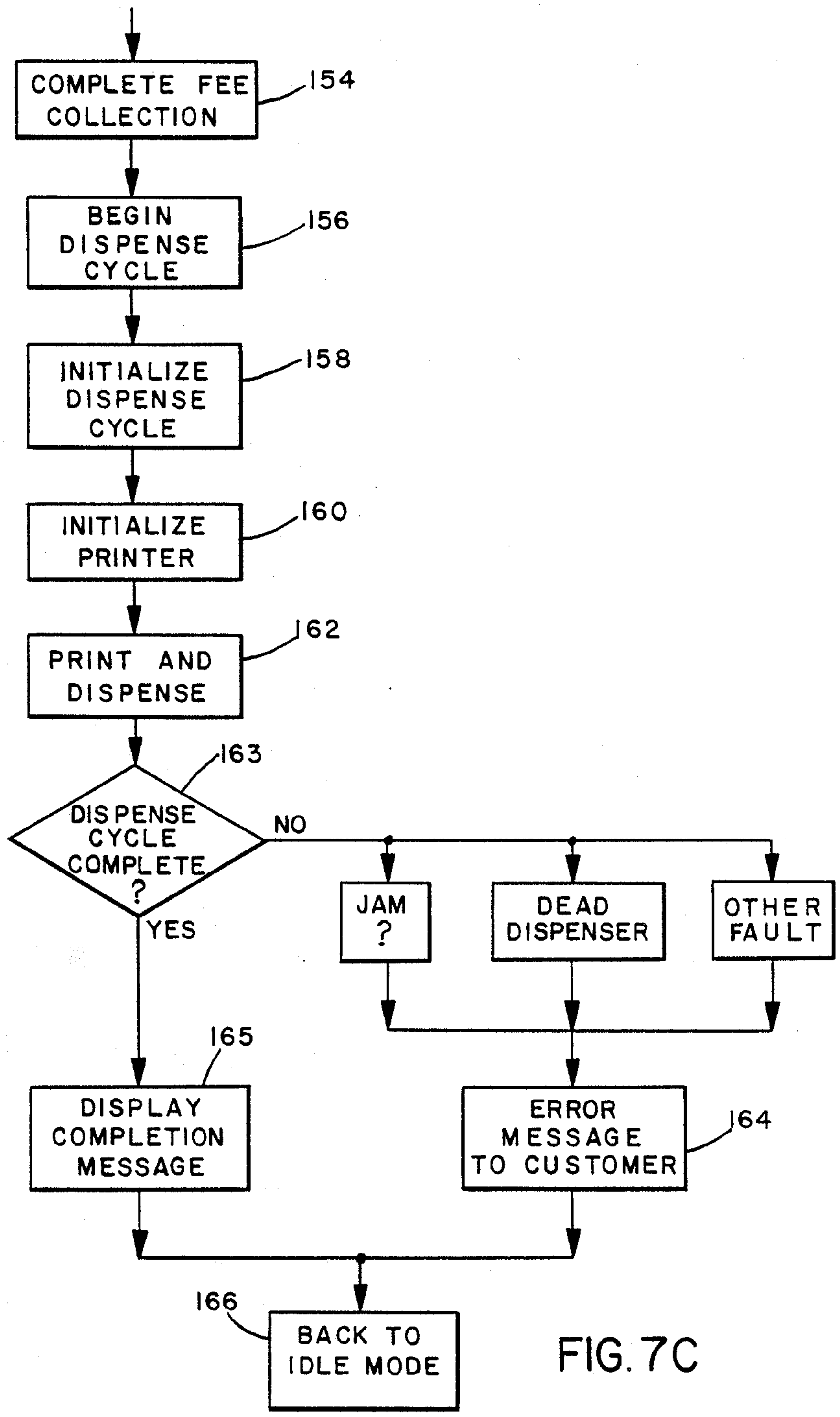

FIGS. 7A, 7B and 7C illustrate the flow diagram showing the steps in operation of the automatic registration system described above. It will be understood that the specific software programming for performing these steps is within the scope of one skilled in the field with knowledge of the flow diagram requirements. The flow diagram illustrated is for a specific type of fee-paying transaction, that of vehicle registration. However, it will be understood that the system could easily be modified to accomplish additional or alternative fee-paying transactions, such as driver's license extensions, hunting or fishing licenses, taxes, parking tickets, phone or other utility bill payment, and so on. Also, the requirements for vehicle registration vary from state to state and from country to country, and it will be understood that the information obtained, types of payment accepted, and form of the registration receipt can be varied according to the requirements of the particular licensing or registration authority involved.

When the system is first powered, it enters a system self test mode 110 to determine operability of internal components and external interfaces. If any fault is found, an out of service message is displayed on the screen. If no faults are detected, the system enters the idle mode 112 awaiting customer input. During the idle mode, preliminary information messages are displayed on the screen. The messages are alternated to prevent screen burn-in. The messages displayed include instructions to the customer to either insert a credit card or press the "OK" button on the keyboard in order to initiate a transaction.

While the system is in the idle mode, it runs through the self testing procedure repeatedly, polling all hardware peripherals to determine and monitor the system status continuously until a customer input is detected (step 115) or a fault is detected. While in the idle mode, a local monitor mode 114 allows on-site access to authorized maintenance or other personnel to obtain internal statistics and interact with the system file information. This access is security controlled and can only be entered by means of a password and/or access control card. This is useful as a maintenance mode for the system. A remote maintenance and monitoring capability is also provided by remote monitor mode 116, which is available at all times while the main program is running to allow a remote computer to call up the system via the telephone line connected to the point of sale modem, allowing the remote computer and local system to exchange information at any time. This provides a remote access to status files, data and program areas, allowing supervisory and maintenance personnel to investigate any system faults, for example, and allowing monitoring to determine when the system needs re-stocking with receipt forms, for example. Access to the files and program areas will be limited by passwords to provide multi-tiered security in this mode. The remote monitor mode also allows the system to place an outgoing call to notify the appropriate authority should inventory be low or some other type of problem be detected during self testing.

A customer initiates a transaction by either entering a credit card (step 118) or pressing a predetermined key on the keyboard (step 120), such as the "OK" key. If a credit card is detected, the system checks whether or not the card is readable (step 121), and whether it is an acceptable type of credit card (for example, the system may be limited to operate only with major credit cards). If the card cannot be read, the card is returned and the user is notified by a suitable screen. The message includes instructions to the customer to reinsert the card in the correct orientation, in case it was not inserted correctly. If the card is not inserted within a certain time period, the transaction is ended and the system returns to the idle mode. The customer will typically be allowed only a limited number of attempts to reinsert a card before the transaction is ended. If the card is not of an acceptable type, an appropriate information message will be displayed including information on the type of credit card acceptable to the machine.

If the card is of an acceptable type and can be read correctly, a preliminary information message (step 122) is displayed. The same message is displayed if the procedure is initiated by the customer depressing the "OK" button (step 120), indicating that a non-credit transaction (i e. cash, check or billing) is desired. Such transactions may not be available in all cases, depending on the particular authority involved.

The preliminary information message will include instructions to the customer on the information he or she will need to have available in order to complete the transaction. Again this will vary according to the particular state involved, but will typically include at least the vehicle license number, identification number subset, and insurance company name, for example. The information listed on the screen at this point will therefore vary from state to state and will include all information needed from the customer to complete the transaction for that state. The customer is instructed to press the CANCEL button if he does not have all the necessary information available. If a card was inserted, it will be returned at this point and the system will return to the idle state. If the customer has all the necessary information, the OK button is pressed to continue.

The customer is next asked to enter all the necessary information. Again this will vary from state to state, but in the typical example given the customer is first asked to enter the registration ID number printed on the registration renewal form. After each entry, the user can press CANCEL to cancel the transaction or OK to continue, as above. During all user entries, a preset time limit is used after which the transaction is cancelled if no entry is made.

In step 126, the customer is asked to enter the last four digits of the vehicle identification number (VIN) printed on the registration renewal form. The customer is then asked to enter the license plate number (step 128), and to enter insurance information (step 130). Typically, a display of major insurance companies along with selection codes will be provided on the screen. The customer enters the appropriate code to designate his particular insurance provider. Alternatively, the name of the company may be typed in. The customer may also be prompted to enter the policy number, if this information is required. Other information which may be requested during the information collecting process, may include the vehicle type (e.g. automobile, commercial, motorcycle or RV) and make, and the number of years for which the registration is to be renewed. Other information which may be required by the particular state authority, may include an emission control compliance number or receipt, and/or a safety or vehicle inspection compliance number. Such compliance numbers may, for example, be provided by appropriate testing stations on successful completion of the required tests. Alternatively, such testing stations may update the central or remote computer directly, as is currently planned in Florida, for example, so that the system can check compliance with vehicle registration testing requirements during verification of a transaction with the remote computer.

Once all the required information has been entered by the customer and stored by the computer (step 131), a message is displayed on the screen indicating that the information is being processed and asking the customer to await further instructions. The information may be processed locally by the system computer in the case of certain standard transactions which do not require additional data and/or verification from the remote data base, but in the majority of cases a remote database must be accessed in order to obtain the registration information for verification purposes. The information received from the remote database will be compared with the information received from the customer. On initiation of the verification and registration process (132), a timer will be set (133) for the remote computer response. This will normally be the state vehicle registration data base. The system determines whether the information is sufficient to be processed locally or whether information is needed from the remote database in step 134. If local processing is possible, the system performs a fee calculation from tables provided in the on-site computer data base (step 135). If information is needed from the remote data base, the system attempts to access the remote computer (step 136) via the interface and modem link. If a link cannot be achieved within a predetermined time interval as set by the timer in step 133, for example due to a busy line or because the remote computer is inoperative, the customer is informed that the state computer is currently not available and is asked to try again later.

If the remote computer is successfully accessed, the system will exchange information with the remote data base in order to verify the transaction (step 140). The on-site computer at the terminal compares the information entered by the customer with that received from the remote database. If the registration information obtained from the state computer indicates that there is some problem with the renewal so that the registration cannot be processed via the remote terminal, for example if there are outstanding fines or if the vehicle has already been registered, the customer is instructed to go to the nearest registration office for manual processing of the registration, and the transaction is cancelled. If any of the information entered by the customer does not match the information in the state authority records, the customer is given the opportunity to re-enter the particular information in dispute. For example, the digits of the VIN or the license number entered may not match those in the remote computer records. In this case, the customer is given a preset number of attempts to re-enter the information, after which the transaction will be cancelled if the information cannot be verified. Optionally, the system may allow for entry of the customer's last name once the registration details have been verified, and may allow the customer to change the address in the vehicle registration records. If the name does not match that obtained from the remote computer, the user is informed and given three attempts to re-enter the correct name, after which the transaction is automatically cancelled.

Selected vehicle registration information may now be displayed on the screen, such as the registered owner's name, the vehicle year and type, and so on. The customer is asked to verify if the information is correct. If the customer indicates it is not correct, the transaction is cancelled and the customer is instructed to go to a local branch office of the authority to have it corrected.

If all the information is verified up to this point, the system approves the transaction, either calculating the registration fee or obtaining the registration fee from the state computer (step 142). The fee information is displayed to the customer (step 144) and the customer is asked to approve the fee (step 145). In the case of a credit card transaction, customer authorization to charge the indicated amount to the inserted credit card account is requested. Customer approval of the fee in the case of a credit card transaction initiates a credit card approval step 146 in which the system communicates via the credit card processing interface with the appropriate credit card network in the standard fashion. If the system is unable to contact the credit agency within a preset time, the customer is informed and asked to try again later. If the credit authorization response is negative for some reason, for example the card has expired or the account is overdrawn, the customer is informed and the transaction is cancelled (step 148).

If the machine supports cash or check payment by means of appropriate cash or check receiving modules, and the customer has selected cash or check as the means of payment, the system collects the cash or check at step 149. Finally, if billing for later payment is acceptable, and the customer has selected this mode, a message indicating that the customer will be billed is displayed (step 150). It will be understood that only one of these payment techniques may be provided in some systems, for example credit card payments only as illustrated in the embodiment shown in FIGS. 1 to 5, in which case steps 149 and 150 will not be included.

If the fee cannot be collected or verified, for example because credit card authorization is not received from the credit card network, the transaction is cancelled in step 148, and the customer is informed and instructed to go to a local registration office to renew the registration. If fee collection is successfully completed, for example by billing the amount to the customer's credit card (step 154), the receipt dispensing cycle is begun (step 156). At the same time, the customer is notified of the amount billed to his credit card, and instructed to remove the card and await issuance of the vehicle registration. In the case of a cash payment, verification of payment is made by a cash acceptor module provided in the machine. If check payment is available, the machine may also be equipped with appropriate mechanisms for reading the check account information, such as an optical/magnetic ink reader or the like.

In the dispensing cycle, the system first performs a dispenser initializing step 158, and initiates the printer (step 160) by loading the EP 500 text buffer. In step 162, the picker unit is controlled to select and retrieve the appropriate blank form, and the printer is controlled to print the appropriate information specific to the particular transaction on the form. Where the dispenser cartridges contain more than one type of form, for example forms bearing stickers carrying different months or forms for more than one type of transaction, the picker unit is controlled to select the appropriate cartridge and retrieve the top form from the stack in that cartridge. After printing, the form is checked and dispensed.

Provision is preferably made for bypassing the delivery slot in the case of detection of an improper form, for example, where double cards have been picked, or where an encoding error, printing error, or the like is detected. The dispenser process is monitored in step 163, and if a jam or other fault in the dispenser is detected, an error message is displayed to the customer (step 164), the transaction, including the billing, is cancelled, and the system returns to the idle mode. If the dispensing cycle is successfully completed, the appropriate message is displayed on the screen (step 165). The customer is asked to remove the registration document, which will contain all the registration information and the necessary sticker or stickers for application to the vehicle license plate. The system now returns to the idle mode (166). The system may store transaction information for later up-dating of the remote computer records on a daily basis, or this may be done on a transaction by transaction basis.

The system can be adapted to allow different types of fee payment and other transactions all to be carried out at one, unattended terminal. For example, several different types of transaction involving vehicles may be provided at the same site. In this case, at the start of any transaction the customer will be prompted to select the type of transaction, and the subsequent procedure will depend on the type selected. For example, a single terminal may be designed to provide automobile registration, driving license extensions, various other types of licenses such as hunting and fishing licenses, payment of parking tickets, tax payments, voter registration and so on. The terminal preferably has the capability to accept address changes, for example, allowing a customer a convenient way to change their address for receiving renewal reminders. This option can be selected by the customer at an early stage in processing, for example once a credit card has been entered or the OK button pressed, the customer can be allowed one of several options, including registration renewal, address changes, driver's license extension, and so on. The terminal may also be arranged to act as a Government Information Center, if desired, providing information to customers on appropriate addresses for particular government services, for example, and information on various procedures.

The automatic fee payment and receipt issuing terminal of this invention therefore allows processing of transactions such as automobile registrations to be achieved quickly and conveniently at an unattended, 24 hour terminal. This will be significantly easier for the customer, avoiding lengthy waits in a manned office at often inconvenient times. The system does not require the government agency computer to be provided with any specialized software to support placement of a number of remote terminals, other than minimal programming to set up appropriate audit trails, for example. Instead, the terminals themselves emulate existing host—terminal communications protocol so that the automatic registration terminal appears to the remote computer as an additional data enquiry/entry station, similar to those currently supported.

The system can be adapted for collection of various types of government or other types of revenue and issuance of the appropriate receipt forms. The system may be programmed for access to more than one remote host computer where different types of transaction are involved, providing a single, unmanned and easy to operate terminal for a customer to perform several different fee payments, considerably reducing time, inconvenience and effort involved in making various payments to different agencies. The terminal is designed for use as an unmanned customer terminal, but may also be incorporated in a behind-the-counter system in which it is connected to the terminal currently used by a counter clerk.

The terminal itself is user friendly, approachable, and easy to use. It is designed to resist entry from vandals, and may be provided with an alarm if required.

Although a preferred embodiment of the invention has been described above by way of example only, it will be understood by those skilled in the field that modifications may be made to the disclosed embodiment without departing from the scope of the invention, which is defined by the appended claims.

We claim:

1. An automatic fee collecting and receipt dispensing system, comprising:

an outer housing;

a customer interface assembly in the housing, including display means for displaying information and instructions to a customer, entry means for allowing customer entry of commands and information, and fee collections means for collecting fees from a customer;

a dispenser assembly in the housing for dispensing receipt forms to customers, including a plurality of cartridges each containing a receipt form supply, each form having blank areas for receiving information specific to a particular transaction, the information printed on the forms in each cartridge differing from that on the forms in the or each other cartridge, a printer for printing information in the blank areas of forms and transport means for transporting form from any one of the cartridges to the printer, and dispensing means for dispensing printed forms to customers;

control means for controlling operation of the customer interface and dispenser assemblies according to stored program instructions; and interface means for connecting said control means to a remote database containing stored information on customer transactions and fees;

said control means further comprising means for detecting entry of information by a customer, means for communicating with said remote database to obtain from said database information specific to the particular transaction, means for comparing said information entered by a customer with corresponding information on that transaction received from said database, means for authorizing the transaction if the information matches and for canceling the transaction if it does not match, means for determining the fee associated with each authorized transaction, means for displaying the fee information to a customer, means for detecting payment of the appropriate fee, and means for controlling said dispenser assembly to dispense a form from the appropriate cartridge according to transaction information entered by the customer or stored in a remote database, and to print information on the particular transaction on the form prior to dispensing.

2. The system as claimed in claim 1, wherein said housing has a horizontal shelf adjacent said customer interface assembly for support of items while conducting a transaction.

3. The system as claimed in claim 1, wherein said control means includes means for qualifying and performing a vehicle registration renewal and for dispensing a renewed registration form, the forms stored in said cartridge each containing pre-printed information on items required for the vehicle registration transaction, and blank areas for printing of information on the specific vehicle registration involved in each transaction.

4. The system as claimed in claim 3, wherein each form comprises a first part containing said pre-printed information and blank areas, and a second part comprising a sticker releasably secured to the first part and including an area for containing information on the next renewal date.

5. The system as claimed in claim 1, wherein the forms include a first part containing pre-printed information and blank areas for entry of information specific to a particular transaction, and a second part comprising at least one sticker releasably secured to the first part, the sticker including an area for containing date information.

6. The system as claimed in claim 1, wherein said payment means includes credit card reader means for receiving credit cards from customers and reading information encoded on the cards, and a credit card interface for connecting said control means to a credit authorization and billing network, said control means further comprising means responsive to customer approval of a fee payment for contacting said network to obtain authorization of the fee and to bill the fee if authorized.

7. The system as claimed in claim 1, wherein the forms in each cartridge have different renewal dates.

8. The system as claimed in claim 1, wherein the forms in each cartridge are for different types of transaction, said control means including program instructions for performing each type of transaction.

9. The system as claimed in claim 1, wherein the printer includes means for printing a magnetic ink stripe on the form and means for encoding information specific to the transaction on the magnetic stripe.

10. The system as claimed in claim 9, wherein said dispenser assembly includes means for receiving encoded forms from a customer, means for decoding the information encoded on the forms, and means for communicating said decoded information to the control means.

11. The system as claimed in claim 1, wherein said stored forms each have multiple parts, including a first part having at least one detachable end portion, and a second part detachably secured to said end portion, the second part comprising a sticker having an area for containing information specific to the transaction.

12. The system as claimed in claim 11, wherein said first part has detachable end portions at its opposite ends, with a sticker detachably secured to each detachable end portion.

13. The system as claimed in claim 12, wherein at least one sticker on each form is pre-printed with the year of the transaction.

14. The system as claimed in claim 13, wherein the other sticker on each form is pre-printed with a month corresponding to the expiry month for a particular fee transaction.

15. A method of automatically collecting fees and dispensing receipts to customers at an unattended terminal, comprising the steps of:

collecting all information required from a customer to perform a specific transaction involving a fee payment;

communicating with a remote database containing stored information concerning the fee transaction involved to receive information on the particular transaction from the database;

comparing the information entered by the customer with that received from the remote database;

verifying the transaction if the information matches;

obtaining information on the fee required for the transaction;

displaying the fee information to the customer on a video display screen;

detecting payment of the required fee by the customer; and controlling a receipt dispensing assembly having a plurality of cartridges each containing a receipt form supply having pre-printed areas and blank areas for receiving information specific to a particular transaction, in response to payment of the fee to select the appropriate cartridge, print transaction information on a receipt form retrieved from the selected cartridge, and dispense the form to the customer.

16. An unattended automobile registration terminal, comprising:

an outer housing;

a customer interface area on the housing including display means for displaying information and instructions to a customer; entry means for entry of information and commands by a customer; and payment means for receiving payment from a customer;

a registration dispensing assembly in the housing, including at least one cartridge containing a series of forms containing pre-printed information concerning automobile registration and blank areas for receiving information specific to a particular transaction, each form including at least one registration sticker detachably secured to the form for application to a vehicle license plate;

a picker mechanism for retracting forms one by one from the cartridge;

a printer mechanism for printing information specific to a particular transaction in the blank areas on a form;

a transport mechanism for transporting forms from the picker mechanism to the printer mechanism; and a dispensing unit for dispensing printed forms from the printer mechanism to a customer;

control means for controlling operation of the system according to stored program instructions, including means for detecting a customer, means for obtaining vehicle registration information from the customer, means for verifying the information obtained with a remote host computer containing vehicle registration records, means for obtaining information on the fee required for the particular vehicle registration, means for displaying said fee information to the customer, means for verifying payment of the fee by the customer, and means for controlling said dispensing assembly to print the required information on a registration form and to dispense the form to the customer 17. An automatic fee collecting and receipt dispensing system, comprising:

a customer interface assembly including display means for displaying information and instructions to a customer, entry means for allowing customer entry of commands and information, and fee collection means for collecting fees from a customer;

form supply means containing receipt forms having blank areas for receiving information specific to a particular transaction;

printer means for printing information on the blank areas of a form, including means for encoding magnetic information specific to a particular transaction on a magnetic stripe on the form;

transport means for transporting forms from said form supply means to said printer means;

dispensing means for dispensing printed forms to customers;

said entry means including means for receiving encoded forms from a customer;

decoder means for decoding the information encoded on a received form;

control means for controlling operation of the system according to stored program instructions; and interface means for connecting said control means to a remote database containing stored information on customer transactions and fees;

said control means further comprising means for detecting entry of information by a customer, means for obtaining decoded information from said decoder means, means for communicating with said remote database to obtain from said database information specific to the particular transaction, means for comparing said information entered by a customer with corresponding information on that transaction received from said database, means for authorizing the transaction if the information matches and for canceling the transaction if it does not match, means for determining the fee associated with each authorized transaction, means for displaying the fee information to a customer, means for detecting payment of the appropriate fee, and means for controlling said dispenser assembly to dispense the appropriate form and to print information on the particular transaction on the form prior to dispensing.

18. An automatic fee collecting and receipt dispensing system, comprising:

an outer housing;

a customer interface assembly in the housing, including display means for displaying information and instructions to a customer, entry means for allowing customer entry of commands and information, and fee collection means for collecting fees from a customer;

a plurality of form supply cartridges in the housing, each cartridge containing a supply of receipt forms having blank areas for receiving information specific to a particular transaction;

printer means for printing information on the blank areas of the forms;

transport means for transporting forms from any one of the cartridges to the printer means;

dispensing means for dispensing printed forms to customers;

control means for controlling operation of the system according to stored program instructions; and interface means for connecting said control means to a remote database containing stored information on customer transactions and fees;

said control means comprising means for detecting input of information regarding a particular transaction by a customer, means for determining the fee associated with each transaction, means for displaying the fee information to a customer, means for detecting payment of the appropriate fee, and means for controlling said dispenser assembly to dispense a form from the appropriate cartridge and to print information on the particular transaction on the form prior to dispensing.

19. An automatic fee collecting and receipt dispensing system, comprising:

an outer housing;

a customer interface assembly in the housing, including display means for displaying information and instructions to a customer, entry means for allowing customer entry of commands and information, and fee collection means for collecting fees from a customer;

a dispenser assembly in the housing for dispensing receipt forms to customers, including at least one cartridge containing a supply of receipt forms, each form containing pre-printed information on items required for a vehicle registration transaction, and blank areas for printing of information on the specific vehicle registration involved in each transaction;

the dispenser assembly further including a printer for printing information in the blank areas of the form, transport means for transporting forms from the cartridge to the printer, and dispensing means for dispensing printed forms to customers;

control means for controlling operation of the customer interface and dispenser assemblies according to stored program instructions; and interface means for connecting said control means to a remote database containing stored information on customer transactions and fees;

said control means comprising means for qualifying and performing a vehicle registration renewal and for dispensing a renewed registration form, including means for detecting entry of vehicle information by a customer, means for communicating with said database to obtain from said database information specific to the particular registration transaction, means for comparing said information entered by a customer with corresponding information on that transaction received from said database, means for authorizing the transaction if the information matches and for canceling the transaction if it does not match, means for determining the fee associated with each authorized transaction, means for displaying the fee information to a customer, means for detecting payment of the appropriate fee, and means for controlling said dispenser assembly to dispense the appropriate form and to print information on the particular vehicle registration transaction on the form prior to dispensing.

* * * * *